US010067692B2

(12) United States Patent
Liu et al.

(10) Patent No.: US 10,067,692 B2
(45) Date of Patent: Sep. 4, 2018

(54) METHOD AND APPARATUS FOR BACKING UP AND RESTORING CROSS-VIRTUAL MACHINE APPLICATION

(71) Applicant: International Business Machines Corporation, Armonk, NY (US)

(72) Inventors: Xiao Xi Liu, Beijing (CN); Yuan Wang, Beijing (CN); Jing Min Xu, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/893,250

(22) PCT Filed: Apr. 11, 2014

(86) PCT No.: PCT/CN2014/075177
§ 371 (c)(1),
(2) Date: Nov. 23, 2015

(87) PCT Pub. No.: WO2014/190806
PCT Pub. Date: Dec. 4, 2014

(65) Prior Publication Data
US 2016/0202923 A1 Jul. 14, 2016

(30) Foreign Application Priority Data

May 31, 2013 (CN) .......................... 2013 1 0215104

(51) Int. Cl.
*G06F 3/06* (2006.01)
*G06F 9/455* (2018.01)
(Continued)

(52) U.S. Cl.
CPC ............ *G06F 3/0617* (2013.01); *G06F 3/065* (2013.01); *G06F 3/0652* (2013.01);
(Continued)

(58) Field of Classification Search
None
See application file for complete search history.

(56) References Cited

U.S. PATENT DOCUMENTS 7,689,859 B2    3/2010  Westenberg
8,060,476 B1 *  11/2011 Afonso ............... G06F 11/1451
                                                        707/649
(Continued)

FOREIGN PATENT DOCUMENTS

CN     101344863 A     1/2009
CN     102521083 A     6/2012
(Continued)

OTHER PUBLICATIONS

"An Apparatus for Autonomic Backup of Complex Data Systems in a Cloud Computing Environment", ip.com, IPCOM000223174D, Publication Date: Nov. 6, 2012, http://ip.com/IPCOM/000223174.
(Continued)

*Primary Examiner* — Christopher D Birkhimer
(74) *Attorney, Agent, or Firm* — Scully, Scott, Murphy & Presser, P.C.; David Quinn, Esq.

(57) ABSTRACT

The present invention discloses a method and apparatus. The method comprises: a method for backing up an application, the application running across multiple virtual machines, the method comprising: in response to a need of backing up the application, executing a first set of scripts that are used for, prior to the backup, coordinating the multiple virtual machines to enter into a preparation state; in response to the first set of scripts being executed completely, triggering a backup operation of at least one backup agent that manages the multiple virtual machines, the backup operation comprising the backup agent locating data related to the application on the respective virtual machines managed thereby; in response to completion of the backup operation, executing a second set of scripts that are used for restoring running (Continued)

of the multiple virtual machines. By virtue of the method and apparatus in the embodiments of the present invention, backup and restore for a cross-virtual-machine application may be performed.

10 Claims, 4 Drawing Sheets

(51) Int. Cl.
*G06F 9/46* (2006.01)
*G06F 11/14* (2006.01)

(52) U.S. Cl.
CPC .......... *G06F 3/0664* (2013.01); *G06F 3/0683* (2013.01); *G06F 9/45558* (2013.01); *G06F 9/461* (2013.01); *G06F 11/1435* (2013.01); *G06F 2009/4557* (2013.01); *G06F 2009/45562* (2013.01); *G06F 2009/45583* (2013.01); *G06F 2201/815* (2013.01)

(56) References Cited

U.S. PATENT DOCUMENTS

| | | | | |
|---|---|---|---|---|
| 8,307,177 | B2* | 11/2012 | Prahlad | G06F 11/1453 711/162 |
| 8,335,902 | B1 | 12/2012 | Feathergill | |
| 8,375,003 | B1* | 2/2013 | Afonso | G06F 11/1451 707/639 |
| 8,495,316 | B2* | 7/2013 | Nagarkar | G06F 9/45533 711/162 |
| 8,650,165 | B2* | 2/2014 | Thakur | G06F 17/30082 707/694 |
| 8,677,355 | B2 | 3/2014 | Spradlin et al. | |
| 8,689,034 | B2* | 4/2014 | Alsina | G06F 11/1458 713/300 |
| 9,275,083 | B2* | 3/2016 | Thakur | G06F 17/30082 |
| 2009/0313447 | A1* | 12/2009 | Nguyen | G06F 11/1451 711/162 |
| 2010/0262797 | A1* | 10/2010 | Rosikiewicz | G06F 17/30067 711/162 |
| 2011/0185129 | A1 | 7/2011 | Landau et al. | |
| 2012/0072685 | A1 | 3/2012 | Otani | |
| 2012/0084261 | A1 | 4/2012 | Parab | |
| 2012/0109958 | A1* | 5/2012 | Thakur | G06F 17/30289 707/737 |
| 2012/0159478 | A1 | 6/2012 | Spradlin et al. | |
| 2012/0203742 | A1 | 8/2012 | Goodman et al. | |
| 2013/0006943 | A1 | 1/2013 | Chavda et al. | |
| 2013/0024424 | A1 | 1/2013 | Prahlad et al. | |
| 2013/0061014 | A1* | 3/2013 | Prahlad | G06F 11/1453 711/162 |
| 2014/0143217 | A1* | 5/2014 | Thakur | G06F 17/30289 707/694 |

FOREIGN PATENT DOCUMENTS

| | | |
|---|---|---|
| CN | 102541686 A | 7/2012 |
| CN | 102609296 A | 7/2012 |
| CN | 103092674 A | 5/2013 |
| JP | 2009533777 A | 9/2009 |
| JP | 2009539162 A | 11/2009 |
| JP | 2010271882 A | 12/2010 |
| JP | 2011253350 A | 12/2011 |

OTHER PUBLICATIONS

"A Method of Application Log Backup and Recovery When Using a Virtual Machine Snapshot", ip.com, IPCOM000224388D , Publication Date: Dec. 17, 2012, http://ip.com/IPCOM/000224388.
"An Efficient Method for Immediate Recovery of Large Scale Data Center From Block-Level Backups" ip.com, IPCOM000222918D, Publication Date: Oct. 29, 2012, http://ip.com/IPCOM/000222918.
"Backup and Disaster Recovery for VM, Physical and Cloud", AppAssure, Dell Software, http://www.appassure.com/solutions/server-backup/, printed Nov. 11, 2015, pp. 1-5, http://www.appassure.com/solutions/server-backup/.
Bowker et al., "Backup and Recovery of Large-Scale Vmware Environments", ESG White Paper commissioned by EMC, 2012, The Enterprise Strategy Group, Inc., Feb. 2012, http://www.emc.com/collateral/analyst-reports/esg-emc-backup-recovery-large-scale-vmware-environments.pdf.
International Search Report, PCT/CN2014/075177.
Chinese Office Action dated Dec. 5, 2016.
"Powershell Script to Shutdown, Startup, Backup Virtual Machines"; Whitebeard; Jan. 5, 2011; http://community.spiceworks.com/how_to/1793-powershell-script-to-shutdown-startup-backup-virtual-machines; [Accessed Dec. 16, 2015 and Jan. 19, 2016].
Examination Report dated Dec. 18, 2015 received from the European Patent Office in corresponding foreign Application GB1520851.5.
"Pro VMWARE VSPHERE 5", Impress Japan, 1st Edition, May 11, 2012, pp. 288-308 (document showing a well-known technique).
"VMWARE", Shoeisha Co., Ltd., 2nd edition, Nov. 11, 2010, pp. 406-433, (document showing a well-known technique).
English-language machine translation of Japanese Notification of Reasons for Refusal dated Feb. 26, 2018, received in a corresponding foreign application.

* cited by examiner

METHOD AND APPARATUS FOR BACKING UP AND RESTORING CROSS-VIRTUAL MACHINE APPLICATION

BACKGROUND

The present invention relates to application backup and restore, and more specifically, relates to methods and apparatuses for backing up and restoring a cross-virtual-machine application.

There are backup and restore solutions at operating system level and virtual machine level in the prior art. However, when backing up a cross-virtual-machine application, existing backup and restore solutions for a single virtual machine or a single operating system cannot be applied directly. For an application running across multiple virtual machines, different parts of the application run on different virtual machines. For example, database part and application service part of the application may run on different virtual machines. Therefore, when backing up a cross-virtual-machine application, it is required to guarantee data coordination among multiple virtual machines where the application is located.

Besides, in the prior art, for each application, it requires to design a backup solution specific to the application. Since the applications vary from each other, the existing manner is not a universal solution, which makes the efficiency of the application backup and restore very low.

In view of the above, there is still much room for improvement for the prior art; therefore, it is desirable for providing a universal technical solution for backing up and restoring a cross-virtual-machine application.

SUMMARY

According to a first aspect of the present invention, there is provided a method for backing up an application, the application running across multiple virtual machines, the method comprising: in response to a need of backing up the application, executing a first set of scripts which is used for, prior to the backup, coordinating the multiple virtual machines to enter into a preparation state; in response to the first set of scripts being executed completely, triggering a backup operation of at least one backup agent that manages the multiple virtual machines, the backup operation comprising the backup agent locating data related to the application on the respective virtual machines as managed thereby and performing backup; in response to completion of the backup operation, executing a second set of scripts which is used for restoring running of the multiple virtual machines.

According to a second aspect of the present invention, there is provided a method for restoring an application, the application running across multiple virtual machines, the method comprising: in response to receiving an instruction for restoring the application, invoking and executing a first set of restore scripts which is used for entering into a restore preparation state; in response to the first set of restore scripts being executed completely, triggering at least one recovery agent to perform a restore operation, the restore operation comprising the restore agent copying backup data related to the application to a virtual machines as managed thereby; in response to completion of the restore operation, invoking and executing a second set of restore scripts which is used for restoring running of the multiple virtual machines.

According to a third aspect of the present invention, there is provided an apparatus for backing up an application, the application running across multiple virtual machines, the apparatus comprising: a first script execution module configured to, in response to a need of backing up the application, execute a first set of scripts which is used for, prior to the backup, coordinating the multiple virtual machines to enter into a preparation state; a backup module configured to, in response to the first set of scripts being executed completely, trigger a backup operation of at least one backup agent that manages the multiple virtual machines, the backup operation comprising the backup agent locating data related to the application on the respective virtual machines as managed thereby and performing backup; and a second script execution module configured to, in response to completion of the backup operation, execute a second set of scripts which is used for restoring running of the multiple virtual machines.

According to a fourth aspect of the present invention, there is provided an apparatus for restoring an application, the application running across multiple virtual machines, the apparatus comprising: a first set of restore scripts running module configured to, in response to receiving an instruction for restoring the application, invoke and execute a first set of restore scripts which is used for entering into a restore preparation state; a restore module configured to, in response to the first set of restore scripts being executed completely, trigger at least one restore agent to perform a restore operation, the restore operation comprising the restore agent copying backup data related to the application to a virtual machine as managed thereby; and a second set of restore scripts running module configured to, in response to completion of the restore operation, invoke and execute a second set of restore scripts which is used for restoring running of the multiple virtual machines.

By adopting the methods and apparatuses of the present invention, a universal technical solution for backing up and restoring a cross-virtual-machine application can be provided.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
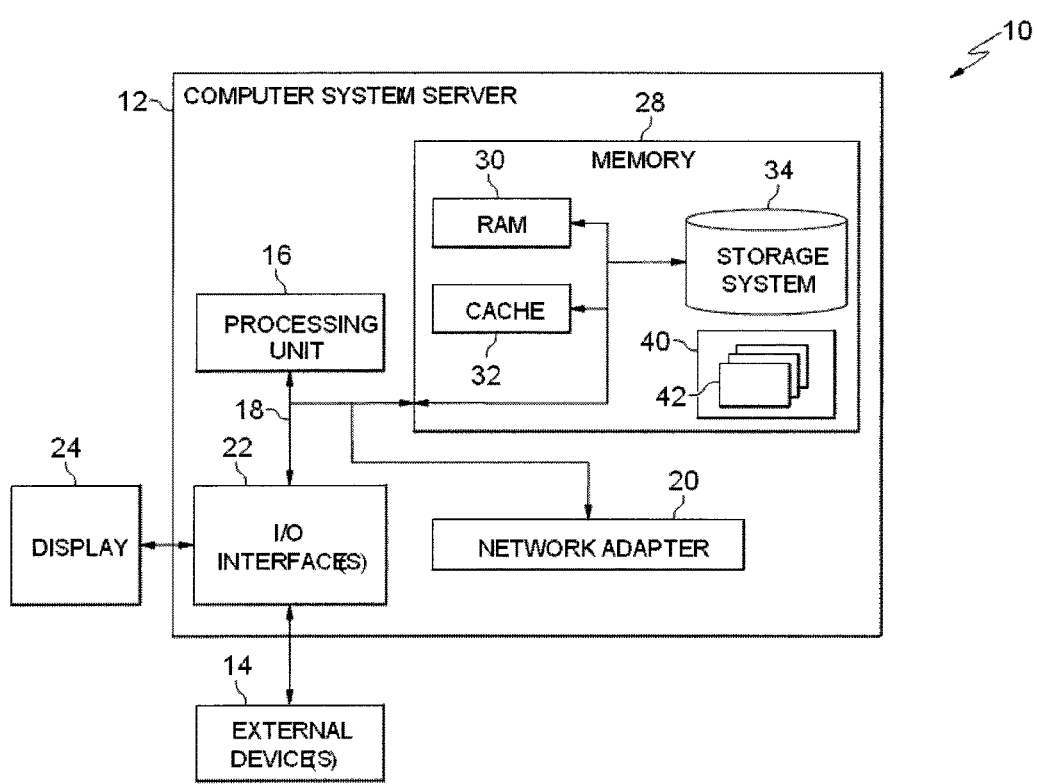
FIG. 1 shows a block diagram of an exemplary computer system/server 12 which is adapted to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
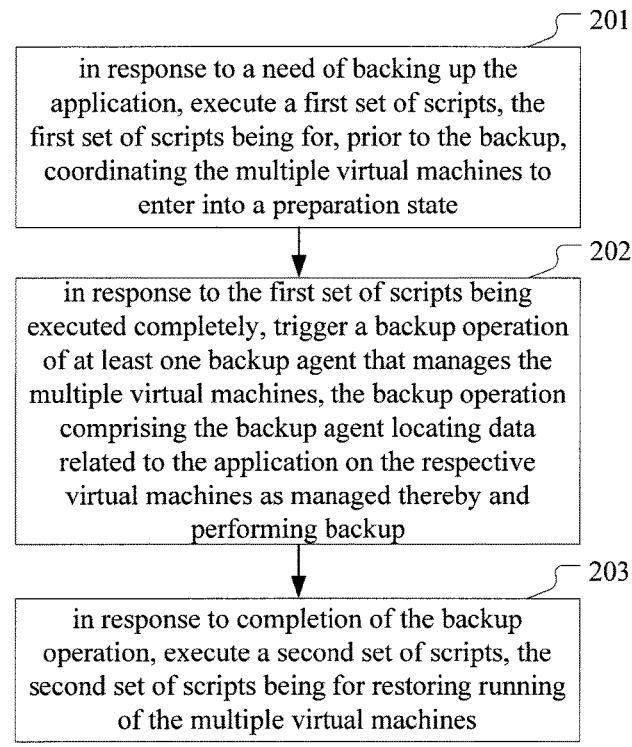
FIG. 2 shows a flowchart of a method for backing up an application according to one embodiment of the present invention.

Now refer to FIG. 2, which shows a flowchart of a backup method for backing up a cross-virtual-machine application according to one embodiment of the present invention. The multiple virtual machines which the application runs across may be located either on a same physical node or on multiple physical nodes. As shown in FIG. 2, the method comprises at least step 201, step 202, and step 203.

At step 201, in response to a need of backing up the application, a first set of scripts is executed. The first set of scripts is used for, prior to the backup, coordinating the multiple virtual machines to have them enter into a preparation state.

The first set of scripts and the second set of scripts may be pre-stored on a backup/restore server and uploaded to the server by a user in advance. Therefore, the scripts as applied in steps 201, 202 and 203 may be retrieved from the backup/restore server. The first set of scripts and the second set of scripts are generally provided by a developer of the application, being available for the user to execute upon backing up the application.

In one embodiment, a backup management portal may be provided on the backup/restore server, being available for the user to perform various backup management operations. After the application is deployed completely, the user may set up a backup policy (backup time, backup quantity, and the like) and SLA and the like through the backup management portal.

It is determined whether it is necessary to back up the application based on a received backup instruction. The backup instruction may be issued at a pre-set time according to the backup policy or provisionally issued by the user through the backup management portal.

In one embodiment, when the application comprises a database, the first set of scripts includes a script having the database of the application enter into a backup state, and the second set of scripts includes a script having the database of the application restore its running. For example, the first set of scripts may execute at least one of the following operations: stopping the database and setting the database to a write suspend state; and setting the database to a memory write state (the write operation is not flushed to a permanent memory). Correspondingly, the second set of scripts may execute an operation contrary to the first set of scripts: initiating the database to restore the database from a write suspend state to normal running; and restoring the database from a memory write state to normal running.

In one embodiment, when the application comprises an application server, the first set of scripts includes a script having the application server of the application enter into a backup state; the second set of scripts comprises a script having the application server of the application restore its running. For example, the first set of scripts may execute the following operations: stopping the application server and setting the application server to only accept a read request. Correspondingly, the second set of scripts performs an operation contrary to the first set of scripts, for example, restoring the running of the application server, and setting the application server to be capable of accepting a read request.

In one embodiment, the first set of scripts includes a script having the application enter into a backup state; the second set of scripts includes a script having the application restore running. For example, the first set of scripts may be used to accomplish the currently being processed request, set to "not accept a new write request", or set to "not accept any new request". Correspondingly, the second set of scripts executes an operation contrary to the first set of scripts, for example, setting to be capable of accepting new requests.

Of course, those skilled in the art may adopt other types of scripts, as long as the scripts can be used to coordinate multiple virtual machines upon backup. For example, in some other embodiments, the first set of scripts may also be used to stop a message queue server, clear and prepare relevant storage space.

In one embodiment, executing the first set of scripts comprises: distributing the first set of scripts; and executing the first set of scripts on the multiple virtual machines. According to one embodiment, the first set of scripts may be distributed to respective virtual machines where the application is located, and then each virtual machine executes the script relevant to the present virtual machine in the first set of scripts as received. According to another embodiment, the scripts in the first set of scripts are distributed over corresponding virtual machines according to script type. For example, a script related to a database among the set of scripts is distributed to a virtual machine where the application database is located, a script related to an application server among the set of scripts is distributed to a virtual machine where the application server of the application is located, and then each virtual machine executes the received script.

In step 202, in response to the first set of scripts being executed completely, a backup operation of at least one backup agent that manages the multiple virtual machines is triggered. The backup operation comprises that the backup agent locates data related to the application on respective virtual machines as managed thereby and performs backup.

In one embodiment, the backup agent locating data related to the application on respective virtual machines as managed thereby and performing backup comprise performing a snapshot operation on the data related to the application. Thus, by aggregating respective snapshots obtained by all the backup agents through snapshot operations, the snapshots of all to-be-backed-up data of the application on the multiple virtual machines may be obtained. Further, the backup operation further comprises a step of copying the backup data from the snapshots to an external memory. The prior art has provided a plurality of manners of copying backup data from snapshots, for example, copying backup data based on the existing Rsync manner. Since this part belongs to the prior art, it will not be detailed here.

Figure 3A:
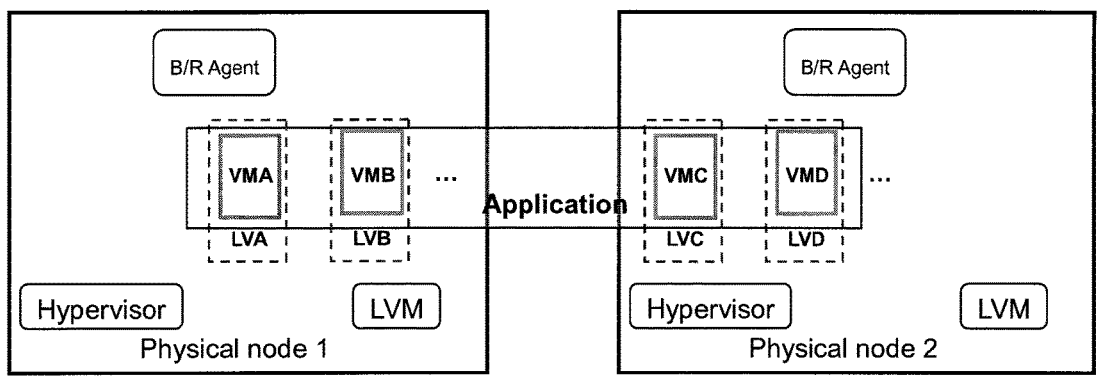
FIG. 3A shows a schematic diagram of a backup agent being located at a physical node according to one embodiment of the present invention.

FIG. 3A shows a schematic diagram of a backup agent being located at a physical node according to one embodiment of the present invention. In this embodiment, the backup agent manages all virtual machines related to the application at the physical node where the backup agent is located. When adopting this embodiment, it is required that the user have operation rights on the physical node and can directly install the backup agent at the physical node, while the backup agent also has rights to perform backup operation on the virtual machine running at the physical node. As indicated in FIG. 3A, two virtual machines are created at physical node 1 and physical node 2, respectively. Thus, the backup restore agent (B/R agent) at physical node 1 may perform a backup operation on virtual machine A (VMA as shown in FIG. 3A) and virtual machine B (VMB as shown in FIG. 3A); the backup agent at physical node B may perform a backup operation on virtual machine C (VMC as shown in FIG. 3A) and virtual machine D (VMD as shown in FIG. 3A).

Figure 3B:
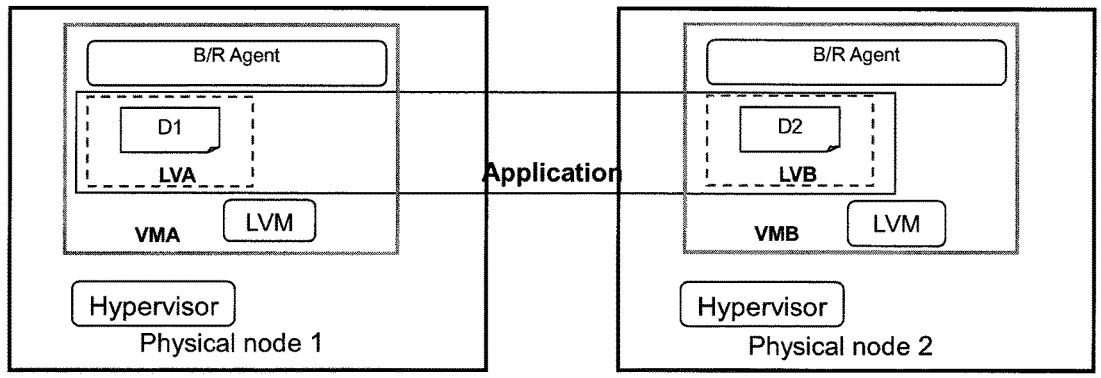
FIG. 3B shows a schematic diagram of a backup agent being located in a virtual machine according to one embodiment of the present invention.

FIG. 3B shows a schematic diagram of a backup agent being located in a virtual machine according to one embodiment of the present invention. In this embodiment, the backup agents are set up within respective virtual machines where the application is located. This embodiment is more common, because in many cases, the user does not directly have operation rights for the physical node; therefore, it is required to implant a backup agent within the virtual machine, such that the backup operation for the data related to the application within the virtual machine may be performed by triggering the backup agent. As shown in FIG. 3B, virtual machine A (VMA) is created at the physical node 1, and virtual machine B (VMB) is created at the physical node 2. Besides, the backup/restore agents are located within respective virtual machines; therefore, each backup/restore agent has rights within the virtual machines to perform backup operation on the data related to the application. For example, the backup/restore agent in the VMA has rights to back up data D1 related to the application in the logical volume A (LVA).

In this embodiment, in order to have a backup agent be located within a virtual machine and manage the virtual machine where the backup agent is located, it is required to provide a customized basic image as the basic image for creating a virtual machine upon deploying the application. The basic image may be customized below: burning the backup agent into the basic image; if it is required to support a snapshot function, a file system management software (for example, LVM) that supports the snapshot function may be installed in the basic image.

There may also adopt a plurality of manners to locate data related to the application. In one embodiment, an identification ID of the virtual machine where the application data is located and a logic volume label in the virtual machine may be provided in a backup instruction; therefore, the backup agent may directly locate corresponding data according to the above identification information so as to perform the backup operation. In another embodiment, a backup instruction might not include such identification information. When the backup agent receives a backup operation, it may collect all data information in the virtual machine where it is located, then feeds back such information to the backup/restore server, and then the backup/restore server informs which data or virtual machine(s) are data related to the application.

If it is required to support a snapshot function, then when installing the application based on the abovementioned customized basic image, the application should be installed within one or more logic volumes managed by the file system that supports snapshot functions, and the application installation volume information should be registered with the backup/restore system.

The ID of the virtual machine where the application is located may be registered with the backup and restore system when deploying the application. As an alternative manner, the virtual machine ID may be retrieved after the application is deployed completely. With a cloud environment as an example, the virtual machine ID may be read by the backup/restore system from an IaaS or PaaS interface of the cloud.

During running, the following data structure may be maintained in the backup/restore system:

| Application Instance ID | List of Corresponding Virtual Machine IDs | List of Corresponding Backup Contents | Backup Policy |
| --- | --- | --- | --- |
| application_001 | {VM01, VM02, VM03} | {VM01: {LV01, LV03}, VM02: {LV05}, VM03: {LV02}} | The backup starts at 24:00 each Saturday, and keep 3 copies of backup data |

When triggering the backup agent to perform the backup operation according to the backup policy, the list of corresponding backup contents and the backup policy are sent to the backup agent based on the virtual machine IDs as managed by the backup agent; the backup agent, after obtaining the list of backup contents and the backup policy, may perform backup according to the above information, for example, the backup may be a snapshot-based backup.

In view of the above, dependent on different setting manners of the virtual machines, the number of virtual machines managed by each backup agent may be different. For example, when the backup agent is located at a physical node, then the backup agent may manage all virtual machines at the physical node; if the backup agent is located within a virtual machine, the backup agent can only manage the virtual machine where it is located. Therefore, the number of backup agents do not necessarily equal to the number of virtual machines where the application is located, as long as the multiple virtual machines where the application is located can be managed.

In step 203, in response to completion of the backup operation, the second set of scripts are invoked and executed, the second set of scripts being for restoring running of the multiple virtual machines. The process of executing the second set of scripts is identical to the manner of executing the first set of scripts, which will not be detailed here.

According to one embodiment of the present invention, the backup agent performs a snapshot operation when locating the data related to the application on the respective virtual machines managed thereby and performing backup. The snapshot technology is widely applied in a storage system, which was first applied in an array and host computer and generally performs processing at block level based on volumes. Backup speed can be significantly promoted by employing the snapshot operation, because the snapshot is actually a reference mark or pointer directed to data stored in the storage device, which records a condition of the data at a certain time. For example, an image of transient data may be provided by establishing a list of pointers for indicating an address of data to be read. Since there generally has no data physical copy during the snapshot creation process, creating a snapshot is almost real-time, which is generally less than 1 second. The principle of snapshot belongs to the prior art, and Applicant will not elaborate it here. However, it should be noted that the snapshot operation in the prior art is usually based on a single system, which is never applied to back up an application running across multiple virtual machines, in particular performing a snapshot operation by coordinating the data related to the application in multiple virtual machines run across by the application through a backup agent.

According to one embodiment of the present invention, in order to support the snapshot operation, the application is deployed in multiple virtual machines that are based on logical volume management (LVM), or the multiple virtual machines are located at a physical node that supports LVM. Logical volume management (LVM) is a well-known disk management manner that supports snapshot operations. For details, please refer to http://en.wikipedia.org/wiki/Logical_Volume_Manager_%28Linux%29. Applicant will not elaborate it here. Besides, those skilled in the art should understand that the VxVM on the existing host computer OS, or VSS of the Windows system, is also a storage management system that supports snapshot, which may be applied to the technical solution of the present application.

Figure 4:
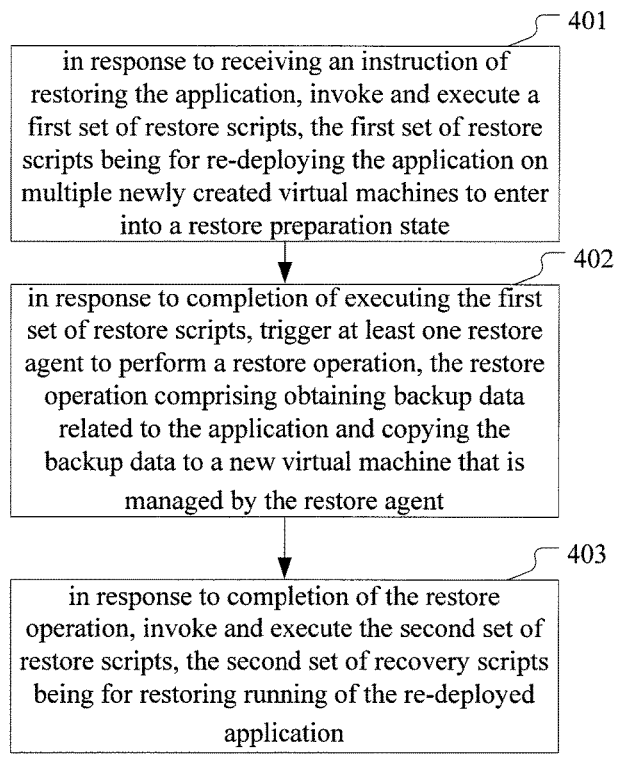
FIG. 4 shows a flowchart of a method for restoring an application according to one embodiment of the present invention.

FIG. 4 shows a flowchart of a method for restoring an application according to one embodiment of the present invention, the application running across multiple virtual machines, the method comprising:

In step 401, in response to receiving an instruction of restoring the application, a first set of restore scripts are invoked and executed, the first set of restore scripts being for re-deploying the application on multiple newly created virtual machines to enter into a restore preparation state.

In one embodiment, the first set of restore scripts are used for: deleting an original virtual machine run by the application instance; and when re-deploying the application on multiple newly created virtual machines, not initiating the re-deployed application. If the application is automatically initiated after being deployed, the application should be stopped. In one embodiment, the multiple virtual machines for deploying new application instances are virtual machines that are created based on a customized image, the customized image comprising a restore agent function.

In step 402, in response to completion of executing the first set of restore scripts, at least one restore agent is triggered to perform a restore operation. The restore operation comprises obtaining backup data related to the application and copying the backup data to a new virtual machine that is managed by the restore agent.

In one embodiment, the restore operation of the restore agent comprises: deleting content corresponding to the backup data on the multiple newly created virtual machines, for example, all contents in the logical volume LV01 and the logical volume LV02 on the virtual machine VM01; copying the backup data to a corresponding location based on a user specified restore policy.

In step 403, in response to completion of the backup operation, the second set of restore scripts are invoked and executed, the second set of restore scripts being for restoring running of the re-deployed application.

In one embodiment, the second set of restore scripts may comprise: modifying application configurations of the re-deployed application based on the new virtual machine environment, for example, changing the database link based on the new IP address, host name, and the like; and initiating the re-deployed application, including initiating the database, application server, etc.

Figure 5:
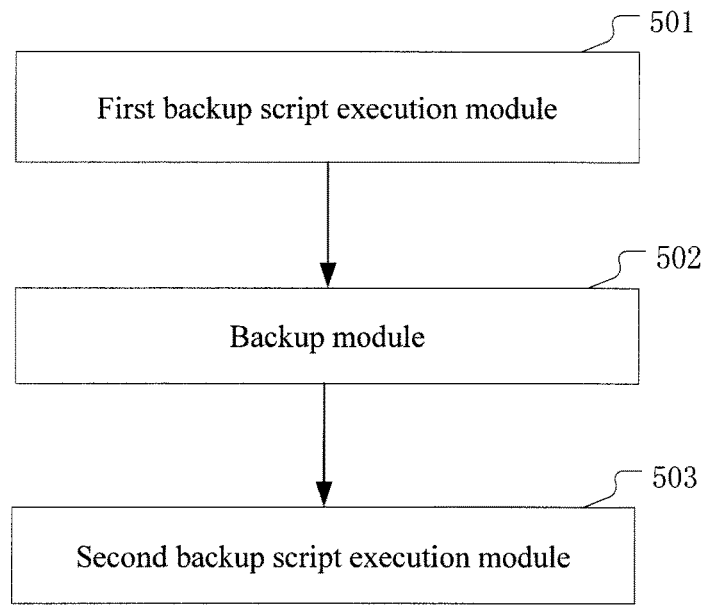
FIG. 5 shows a schematic diagram of an apparatus for backing up an application according to one embodiment of the present invention.

FIG. 5 shows a schematic diagram of an apparatus for backing up an application according to one embodiment of the present invention, the application running across multiple virtual machines, the apparatus comprising:

A first script execution module 501 configured to, in response to a need of backing up the application, execute a first set of scripts. The first set of scripts is used for, prior to the backup, coordinating the multiple virtual machines to have them enter into a preparation state.

A backup module 502 configured to, in response to the first set of scripts being executed completely, trigger a backup operation of at least one backup agent that manages the multiple virtual machines. The backup operation comprises that the backup agent locates the data related to the application on the respective virtual machines as managed thereby and performs backup.

A second script execution module 503 configured to, in response to completion of the backup operation, execute a second set of scripts, the second set of scripts being for restoring running of the multiple virtual machines.

In one embodiment, the first set of scripts and the second set of scripts are provided when deploying the application.

In one embodiment, the backup agent locating data related to the application on the respective virtual machines as managed thereby and performing backup comprise performing a snapshot operation on the data related to the application.

In one embodiment, the backup agent is located at a physical node and manages virtual machine(s) in the physical node. In another embodiment, the backup agent is located in the virtual machine and manages the virtual machine where the backup agent is located.

In one embodiment, there further comprises a module configured to create the multiple virtual machines where the application is located, based on the basic image including the backup agent when deploying the application, such that the backup agent is located in the virtual machine and manages the virtual machine where the backup agent is located. In one embodiment, the basic image further comprises a file system management software that supports a snapshot function.

Figure 6:
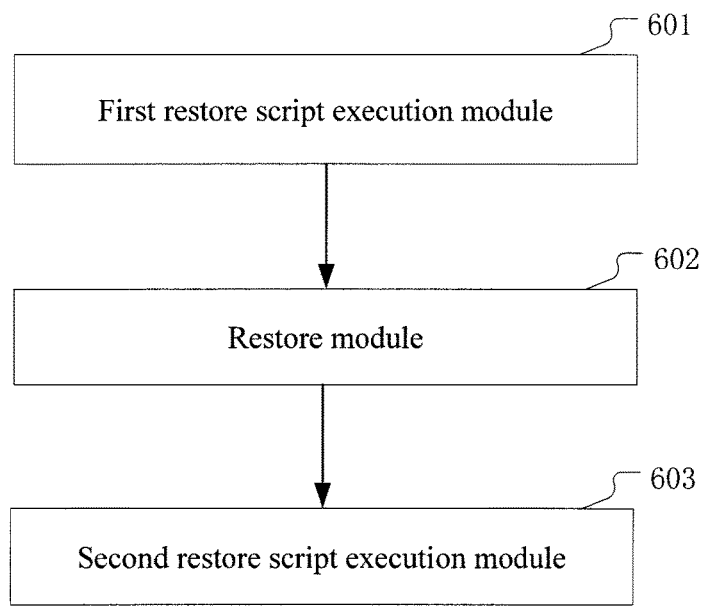
FIG. 6 shows a schematic diagram of an apparatus for restoring an application according to one embodiment of the present invention.

FIG. 6 shows a schematic diagram of an apparatus for restoring an application according to one embodiment of the present invention, the application running across multiple virtual machines, the apparatus comprising:

A first set of restore scripts running module 601 configured to invoke and execute a first set of restore scripts in response to receiving an instruction of restoring the application. The first set of restore scripts are used for re-deploying the application on multiple newly created virtual machines to enter into a restore preparation state.

A restore module 602 configured to, in response to completion of executing the first set of restore scripts, trigger at least one restore agent to perform a restore operation, the restore operation comprising obtaining backup data related to the application and copying the backup data to a new virtual machine that is managed by the restore agent.

A second set of restore scripts running module 603 configured to invoke and execute a second set of restore scripts in response to completion of the backup operation. The second set of restore scripts is used for restoring running of the re-deployed application.

In one embodiment, the first set of restore scripts is used for: deleting multiple original virtual machines where the application is located; and when re-deploying the application on the multiple newly created virtual machines, not initiating the re-deployed application.

In one embodiment, the restore operation of the restore agent comprises: deleting content at a corresponding location of the backup data on the multiple newly created virtual machines; and copying the backup data to the corresponding location based on the restore policy specified by the user.

In one embodiment, the second set of restore scripts include: modifying application configuration of the re-deployed application based on the environment of the multiple newly created virtual machines; and initiating the re-deployed application.

By adopting the technical solution of the present application, it is only required that the physical machine or virtual machine supports backup operation in a general sense (which may be any one of file backup, block storage backup, and whole virtual machine backup or a combination of several of them). This requirement stands for a host computer and a virtual computer in the current cloud computing environment, regardless of whether it uses Linux or Windows OS. Thus, the technical solution of the present application can support both the Linux and Windows OS and therefore has a general purpose.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for backing up at least a first application and a second application, the at least first and second applications running across multiple virtual machines including a first virtual machine and a second virtual machine, the method comprising:
   in response to a need of backing up the at least first and second applications, executing a first set of scripts including a first script and a second script to:
      prior to the backup, coordinate the first and second virtual machines to enter into a preparation state;
      distribute the first script to the first virtual machine; and distribute the second script to the second virtual machine, wherein the first script and the second script are related to a first type of the first application located in the first virtual machine and a second type of the second application located in the second virtual machine, respectively, and wherein the first script is different from the second script, and the first type is different from the second type, one of the first and second scripts executing operations of completing a request being currently processed in a corresponding one of the first and second applications, stopping the corresponding one of the first and second applications, and setting the corresponding one of the first and second applications to accept a read request and not to accept a write request;
   in response to each of the first script and the second script being executed completely, triggering a backup operation of at least one backup agent located in each first and second virtual machines that manages, respectively, the first and second virtual machines, the backup operation comprising the backup agent locating data related to the first and second applications on the respective first and second virtual machines as managed thereby and performing backup, wherein the backup operation performed by each backup agent comprises performing a snapshot operation on the data related to the first and second applications; and
   in response to completion of the backup operation, executing a second set of scripts, the second set of scripts being for restoring running of the first and second virtual machines.

2. The method according to claim 1, wherein:
the backup agent is located at a physical node and manages at least one of the first and second virtual machines in the physical node.

3. The method according to claim 1, wherein:
the backup agent is located in at least one of the first and second virtual machines and manages the at least one of the first and second virtual machines where the backup agent is located.

4. The method according to claim 1, further comprising:
when deploying the first and second applications, creating the first and second virtual machines where the first and second applications are located based on a basic image including the backup agent, such that the backup agent is located in at least one of the first and second virtual machines and manages the at least one of the first and second virtual machines where the backup agent is located.

5. The method according to claim 4, wherein the basic image further comprises a file system management software that supports a snapshot function.

6. An apparatus for backing up at least a first application and a second application, the at least first and second applications running across multiple virtual machines including a first virtual machine and a second virtual machine, the apparatus comprising:
a memory;
a computer including one or more processors in communication with said memory and configured to run a method to:
in response to a need of backing up the first and second applications, execute a first set of scripts including a first script and a second script to:
prior to the backup, coordinate the first and second virtual machines to enter into a preparation state;
distribute the first script to the first virtual machine; and
distribute the second script to the second virtual machine, wherein the first script and the second script are related to a first type of the first application located in the first virtual machine and a second type of the second application located in the second virtual machine, respectively, wherein the first script is different from the second script, and the first type is different from the second type, one of the first and second scripts executing operation of completing a request being currently processed in a corresponding one of the first and second applications, stopping the corresponding one of the first and second applications, and setting the corresponding one of the first and second applications to accept a read request and not to accept a write request;
in response to each of the first script and the second script being executed completely, trigger a backup operation of at least one backup agent located in each first and second virtual machines that manages, respectively, the first and second virtual machines, the backup operation comprising the backup agent locating data related to the first and second applications on the respective first and second virtual machines as managed thereby and performing backup, wherein the backup operation performed by each backup agent comprises performing a snapshot operation on the data related to the first and second applications; and
in response to completion of the backup operation, execute a second set of scripts, the second set of scripts being for restoring running of the first and second virtual machines.

7. The apparatus according to claim 6, wherein the backup agent is located at a physical node and manages at least one of the first and second virtual machines in the physical node.

8. The apparatus according to claim 6, wherein the backup agent is located in at least one of the first and second virtual machines and manages the at least one of the first and second virtual machines where the backup agent is located.

9. The apparatus according to claim 8, wherein said one or more processors are further configured to:
when deploying the first and second applications, create the first and second virtual machines where the first and second applications are located based on a basic image including the backup agent, such that the backup agent is located in the at least one of the first and second virtual machines and manages the at least one of the first and second virtual machines where the backup agent is located.

10. The apparatus according to claim 9, wherein the basic image further comprises a file system management software that supports a snapshot function.

\* \* \* \* \*